Nov. 29, 1955  J. N. MORRELL  2,724,978
VALVE OPERATOR
Filed July 10, 1950　　　　　　　　　　　　　　　　2 Sheets-Sheet 1
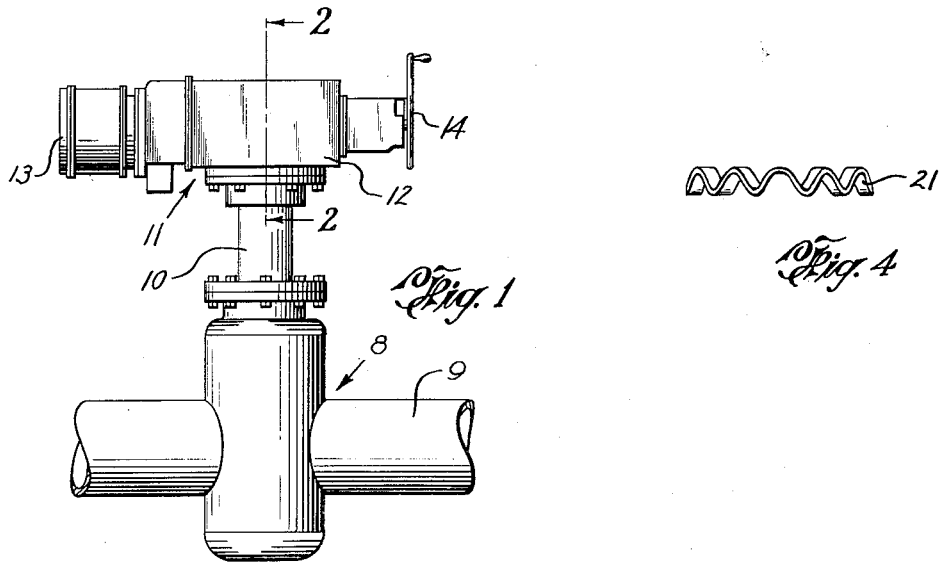
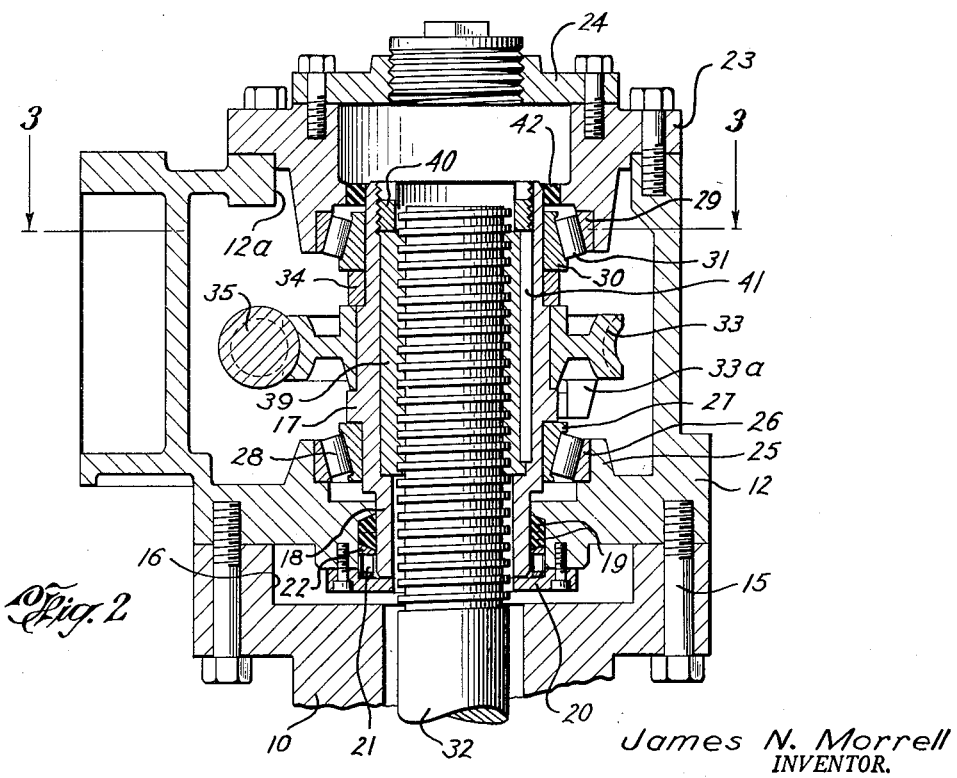
James N. Morrell
INVENTOR.
BY
Browning & Simms
ATTORNEYS Nov. 29, 1955  J. N. MORRELL  2,724,978
VALVE OPERATOR
Filed July 10, 1950  2 Sheets-Sheet 2
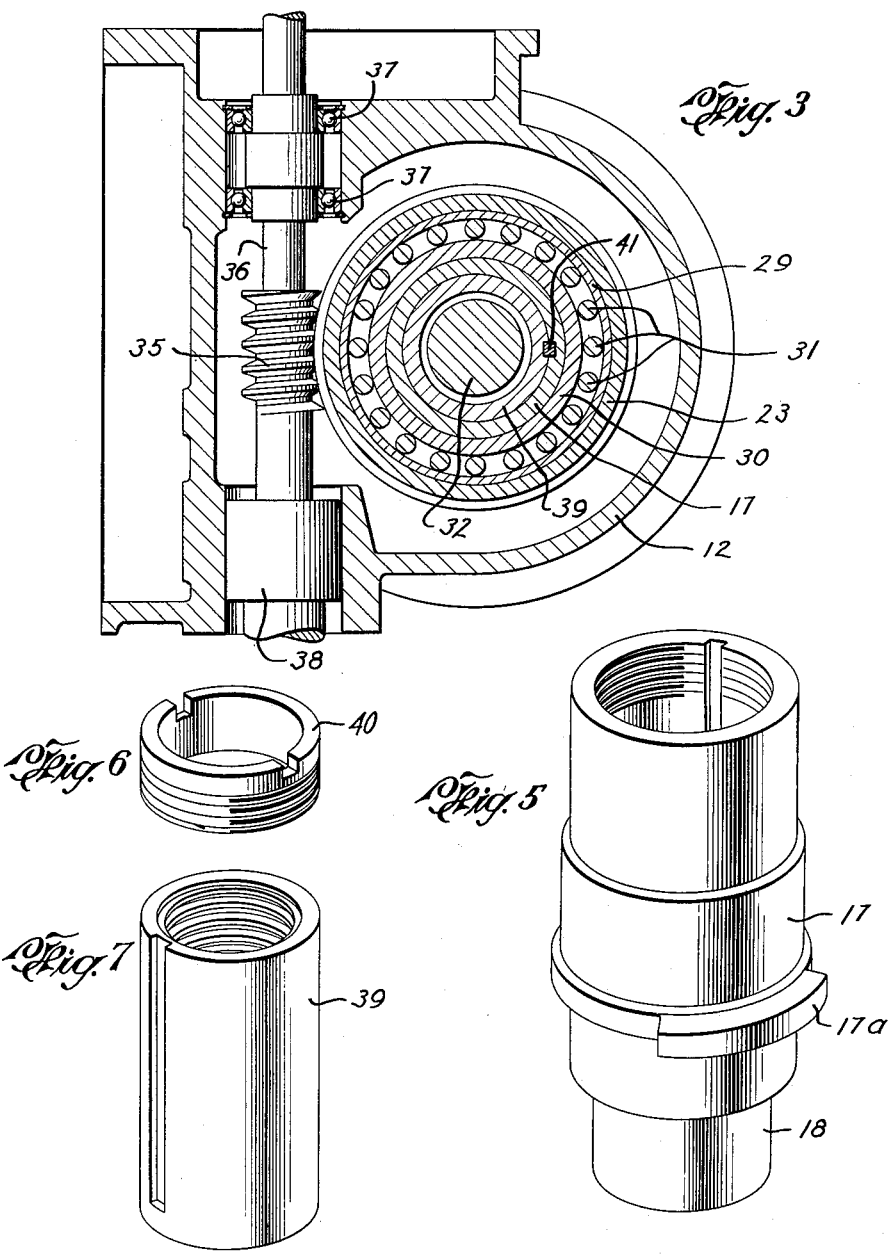
James N. Morrell
INVENTOR.
BY
Browning & Simms
ATTORNEYS

United States Patent Office 2,724,978
Patented Nov. 29, 1955

2,724,978

VALVE OPERATOR

James N. Morrell, Houston, Tex.

Application July 10, 1950, Serial No. 172,841

8 Claims. (Cl. 74—425)

This invention relates to improvements in valve operators and refers more particularly to operators of the class employing power driven means for actuating large valves of the gate and globe type and wherein the operator may or may not provide for manual operation of the valve.

In operators of this class heretofore used, the operators are mounted upon the valve to be actuated and they have a drive connection with the valve stem. Once the operator is mounted upon the valve, if it becomes necessary to replace any part of this drive connection between the operator and the valve stem, it is necessary to dismount the operator from the valve and then to dismantle the operator to a considerable extent in order to accomplish this. There is usually considerable wear upon the part of the operator that has the actual drive connection with the valve stem and heretofore this part has had to be frequently replaced, in its entirety, at considerable cost of both time and money.

An object of this invention is to provide a valve operator of this class wherein the drive connection is readily accessible for repair or replacement of parts without the necessity of dismounting the operator from the valve.

Another object is to provide in an operator of this class a wear member for taking the actual load between the valve stem and the drive connection.

A further object is to provide a wear member for a valve operator for taking the load in the actual actuating connection, which is readily accessible for replacement without the necessity of dismounting the operator.

Still another object is to provide a novel journal for a valve operator, of the class described, for the drive connection between the usual worm gear and the stem of the valve.

A still further object is to provide a valve operator of this class which overcomes the disadvantages heretofore encountered and yet which may be economically manufactured and is simple and rugged in operation.

Other and further objects of the invention will appear as the description proceeds.

In the accompanying drawings forming a part of the instant specification and wherein like reference numerals are used to indicate like parts in the various views:

Fig. 1 is a side elevation illustrating a valve with an operator embodying this invention, mounted thereon;

Fig. 2 is a view taken along the line 2—2 in Fig. 1 in the direction of the arrows, but upon an enlarged scale;

Fig. 3 is a view taken along the line 3—3 in Fig. 2 in the direction of the arrows;

Fig. 4 is a side elevational view of a spring washer used in the lower seal assembly of the operator shown in the foregoing views;

Fig. 5 is a perspective view of the rotary drive member or sleeve of the operator shown in the other views;

Fig. 6 is a perspective view of a lock nut for securing the wear member of a valve operator, shown in Fig. 2, within the sleeve shown in Fig. 5; and Fig. 7 is a perspective view of the wear member which is received within the rotary drive member of Fig. 5.

Referring in detail to the drawings, and more particularly to Fig. 1, a valve is shown generally at 8 disposed in the conduit 9 and carries at its upper end a yoke or bonnet 10 with the usual flange fitting on the valve, and the valve operator of this invention is shown generally at 11, mounted on the yoke or bonnet. This operator includes a housing 12. The embodiment shown has secured to the housing at its left side, as viewed in Fig. 1, a motor 13 constituting the power drive for the power driven turning means. A handwheel 14 extends exteriorly of the housing to the right, as viewed in Fig. 1, and this handwheel constitutes a part of the manual turning means for the operator.

This invention relates more directly to the portion of the mechanism housed in the central portion of housing 12, as detailed in Figs. 2 and 3. The yoke or bonnet 10 is secured to the housing 12 by a plurality of bolts 15 and the yoke has a recess in its upper end, shown at 16.

A rotary drive member or sleeve 17 is journaled in the housing and has a lower reduced diameter portion 18 extending through an opening in the housing 12. The recess 16 in the yoke accommodates a seal assembly for sealing the joint between housing 12 and rotary drive member 18. This seal assembly may include seal elements 19, of any suitable sealing material, and a gland plate 20 bolted to the underside of housing 12. The spring washer 21, shown in Fig. 2 and detailed in Fig. 4, located between plate 20 and washer 22 maintains the seal members 19 under adequate compression. The sleeve or rotary drive member 17 extends upwardly in the housing a sufficient distance that it is always above the lubrication level within the housing. However, a seal for the upper end of this sleeve may be provided, as will be hereinafter described.

The journal for rotary member 17 is carried in part by the housing and in part by a cover assembly for an opening in the housing, including the cover parts 23 and 24. The journal carried by the housing is such that the member 17 may be drawn upwardly from the housing through the housing opening 12a which is closed by the closure assembly. The upward thrust of member 17 is taken by a bearing assembly including parts carried by the closure assembly.

The portion of the journal for member 17, that is carried by the housing directly, may include an annular boss 25 protruding upwardly from the bottom of housing 12 in which may be seated a race 26. The drive member 17 carries a race 27, on a countersunk portion and race 27 preferably has a press fit upon the sleeve. Roller bearings 28 are mounted between the two races 26 and 27. These roller bearings are inclined relative to the vertical and their rotational axes all converge downwardly upon the rotational axis of the member 17. With this arrangement, this bearing assembly takes a portion of the radial load and all of the downward thrust of member 17.

The upward thrust of member 17 is taken by the bearing assembly, including races 29 and 30 and rollers 31. The races are carried by cover part 23 and sleeve 17 respectively. These rollers 31 are oppositely inclined relative to rollers 28 and bear a portion of the radial load and all of the upward thrust.

A seal element 42 may be mounted to seal between closure 23 and the periphery of sleeve 17. The seal, of course, must allow the seal to rotate in its journal.

The drive connection between the gear train for supplying power from the turning means 13 and 14 to the valve stem 32 includes sleeve 17. The gear train may include a worm gear 33 mounted upon sleeve 17. The mounting of the worm gear preferably permits limited rotational movement between the gear and member 17 but a driving connection is provided between the two as, for example, the depending lug 33a carried by the worm gear, which extends through about 90°, and the radial lug 17a formed on the periphery of member 17. The lugs are arranged so that when in engagement, the gear 33 may be rotated through a substantial arc as, for instance about 270°, before the other end of lug 27 will engage lug 17a. This is in order to provide a hammer blow for jarring a stuck valve member loose.

The worm gear 33 is retained against axial movement upon member 17 in a downward direction by an external shoulder formed on the periphery of the drive member. Axial movement of the gear in the other direction is prevented by collar 34 held between an upwardly facing shoulder on member 17 and the race 30.

The worm gear meshes with worm 35 mounted on a shaft 36. Shaft 36 is journaled in the housing, substantially horizontally, by bearing assemblies 37 and 38. This shaft connects to the turning means including the handwheel 14 and the motor 13 in a manner which will be well understood by those skilled in the art and in the interest of simplicity, a direct detailed disclosure of this connection is omitted from the drawings. However, preferred connections for the shaft 36, with the two turning means, are disclosed in the co-pending application for patent for "Valve Operator" filed on the same day as and simultaneously with this application by Lynn T. Elliott and Leon Ince, and identified by Serial Number 172,918, filed July 10, 1950.

The drive member 17 preferably has a drive connection with the stem 32 of the valve through a wear member 39 which may be readily and inexpensively replaced. This wear member may be a bushing nut resting at its lower end against an internal shoulder carried by the sleeve 17 and held in place within the sleeve by a lock nut 40. The inner periphery of sleeve 17 and the outer periphery of wear member 19 have grooves adapted to register so as to receive a key 41. The key locks the bushing nut against relative rotation with the sleeve. Where the connection between the valve and the operator is as shown in the drawings, the bushing nut has internal threads adapted to receive the threaded end of the stem 32. This provides a direct drive connection between the bushing nut and the stem so that rotation of sleeve 17 and bushing nut 39 imparts axial movement to the stem 32 to raise or lower the stem and the valve member carried thereby, dependent upon the rotational sense.

In order that the wear member 39 will be readily accessible for replacement, it is preferred to provide closure 23 with a removable section 24 located just above the wear member. With this arrangement all that is necessary in order to provide for removal of the wear member is to remove the cover 24 and lock nut 40. Then the operator is manipulated to seat the valve member in its lowermost position and further actuation of the operator will cause the wear member 39 to move upwardly due to its threaded connection with the stem. A new wear member may then be inserted within the sleeve and over stem 32 and when it is substantially in place within the member, then key 41 is inserted to lock the sleeve and wear member against relative rotation. The operator is then actuated as though to raise the valve member carried by stem 32 to its uppermost seated position. This actuation of the operator will cause the wear member to move downwardly against the internal shoulder on the sleeve. When in its seated position, lock nut 40 is secured within the threaded upper end of the sleeve to lock the wear member or bushing in its seated position.

It is believed that the operation of the device of this invention is apparent from the foregoing description. The operator for the valve may be of the type that may be driven manually or by motor actuated means or by both. In the preferred embodiment, when either turning means is actuated, the gear train imparts rotation to gear 33 and engagement of lugs 17a and 33a will rotate the sleeve 17. The wear member 39 rotates with the sleeve and due to its drive connection with the valve stem, rotation of the wear member will cause actuation of the valve.

It is contemplated that the drive connection between the valve stem and the operator may not be direct as in the embodiment shown in the drawings but may employ a gear arrangement. Such connections are in conventional use between valves and their operators and are well known to those skilled in the art.

It will be seen that the ends and objects of this invention have been accomplished. There has been provided a valve operator which may be mounted upon the usual yoke 10 of a valve and in which the drive member for the operator may be withdrawn from the operator housing without the necessity of dismounting the operator from the valve if it should become desirable to do so for replacement of bearing parts or the valve member itself. The construction is such that a replaceable wear member may be employed for actually providing the drive connecting part with the valve stem. This wear member also may be readily removed for replacement without necessity of dismounting the operator from the valve or for extensively dismantling the operator itself. The operator of this invention is rugged and relatively simple so that it readily lends itself to economical manufacture and is of great utility for operating large gate or plug valves.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a valve operator having a housing with a gear train for transmitting power for actuating a valve, said gear train including a worm gear, a sleeve rotatably mounted in the housing, said worm gear carried by the sleeve, and an operable drive connection between the sleeve and worm gear, the improvement which resides in the combination therewith of a wear member within the sleeve and mounted to permit longitudinal movement thereof relative to the sleeve, releasable means securing the wear member within the sleeve against such longitudinal movement, said member being secured against rotation relative to the sleeve and having connecting parts providing a drive connection for a valve to be operated, said sleeve being formed with an opening at its end most remote from the valve to permit endwise movement of said wear member into and out of the sleeve upon releasing said releasable means, and said gear train and rotatable mounting for the sleeve being situated out of the path of longitudinal movement of the wear member into and out of said sleeve and providing clearance for removal and insertion of the wear member while the sleeve and gear train remain operatively mounted in said housing.

2. In a valve operator having a housing with a gear train for transmitting power for longitudinally moving a member having a free end to actuate a valve, said gear train including a worm gear, a sleeve rotatably mounted in the housing, said worm gear substantially surrounding the sleeve, and an operable drive connection between the sleeve and worm gear, the improvement which resides in the combination therewith of a wear member within the sleeve and mounted to permit longitudinal movement thereof relative to the sleeve, releasable means securing the wear member within the sleeve against such longitudinal movement, said wear member being secured against rotation relative to the sleeve and having connecting parts providing a drive connection for a valve to be operated, said sleeve having an endwise opening and said housing also having an opening aligned with said endwise opening with both openings arranged to permit endwise movement of said wear member therethrough into and out of the sleeve upon releasing said releasable means, and said gear train and rotatable mounting for the sleeve, while operatively mounted in said housing being situated out of the path of longitudinal movement of the wear member through said openings.

3. The arrangement of claim 2 wherein a removable cover is provided for the opening in the housing.

4. The arrangement of claim 2 wherein the housing opening is arranged to admit the sleeve as well as the wear member, a removable cover part is provided for the opening, and wherein means are carried by said cover part for retaining the sleeve within its mounting, the retaining means being arranged to admit the placement and removal of the wear member from the sleeve while the retaining means is maintained in operative position.

5. In a valve operator of the class having a power driven turning means and a housing with a gear train including a worm gear for transmitting actuating power, the combination therewith of a housing for the worm gear including a rotary drive sleeve surrounded by the worm gear and having a drive connection therewith, a wear member removably mounted within the sleeve and secured against rotation relative to the sleeve and having drive parts providing a rotary drive connection for the member, said housing having an opening in its upper surface, a removable cover part for the opening, said cover part having an opening in axial alignment with said wear member and large enough for the wear member to pass therethrough, and bearing means between the cover part and the sleeve providing an upper journal for the sleeve to take the upward thrust of the sleeve, the upper end of the sleeve and the bearing means providing clearance for removal of the wear member while said cover is in place over said opening.

6. In a valve operator having a housing with a gear train for transmitting power for actuating a valve, said gear train including a drive gear, a sleeve rotatably mounted in the housing, and an operable drive connection between the sleeve and drive gear, the improvement which resides in the combination therewith of a wear member within the sleeve and mounted to permit longitudinal movement thereof relative to the sleeve, releasable means securing the wear member within the sleeve against such longitudinal movement, interengaging slide and guide parts carried by the sleeve and wear member permitting movement of the wear member longitudinally of the sleeve upon releasing said releasable means while securing the wear member against rotation relative to the sleeve, said wear member having connecting parts providing a drive connection with a valve to be operated, and said sleeve being formed with an opening at its end most remote from the valve to receive said wear member thereinto while the sleeve remains rotatably mounted in said housing.

7. The operator of claim 6 wherein said slide and guide parts are a key and keyway longitudinally disposed relative to said sleeve.

8. The operator of claim 7 wherein the key and keyway extend for a length substantially equal to the length of the wear member.

References Cited in the file of this patent

UNITED STATES PATENTS

| | | |
|---|---|---|
| 1,380,527 | Carr | June 7, 1921 |
| 1,419,058 | Klausmeyer | June 6, 1922 |
| 1,662,134 | Smith | Mar. 13, 1928 |
| 2,351,211 | Hodgson | June 13, 1944 |
| 2,481,129 | Le Tourneau | Sept. 6, 1949 |
| 2,489,642 | Hesse | Nov. 29, 1949 |

FOREIGN PATENTS

| | | |
|---|---|---|
| 361,299 | Germany | Oct. 16, 1922 |